US010661839B2

(12) United States Patent
Froemming et al.

(10) Patent No.: US 10,661,839 B2
(45) Date of Patent: May 26, 2020

(54) ROLLER ASSEMBLY FOR A HOOD ACTUATION SYSTEM (71) Applicant: CNH Industrial America LLC, New Holland, PA (US)

(72) Inventors: Dana Lee Froemming, Fargo, ND (US); Michael Sylvester Bares, Fargo, ND (US); Jonathan Richard Nistler, Moorhead, MN (US); Christopher Jerel Brosz, West Fargo, ND (US)

(73) Assignee: CNH Industrial America LLC, New Holland, PA (US)

( * ) Notice: Subject to any disclaimer, the term of this patent is extended or adjusted under 35 U.S.C. 154(b) by 595 days.

(21) Appl. No.: 15/369,523

(22) Filed: Dec. 5, 2016

(65) Prior Publication Data

US 2018/0156321 A1 Jun. 7, 2018

(51) Int. Cl.
*B62D 25/12* (2006.01)
*E05F 15/616* (2015.01)
*E05F 15/53* (2015.01)
*E05F 1/00* (2006.01)
*E05F 7/04* (2006.01)
*E05F 15/622* (2015.01)

(52) U.S. Cl.
CPC .............. *B62D 25/12* (2013.01); *E05F 1/00* (2013.01); *E05F 15/53* (2015.01); *E05F 15/616* (2015.01); *E05F 7/04* (2013.01); *E05F 15/622* (2015.01); *E05Y 2201/638* (2013.01); *E05Y 2201/688* (2013.01); *E05Y 2900/518* (2013.01); *E05Y 2900/536* (2013.01)

(58) Field of Classification Search
CPC .................................................... B62D 25/12
See application file for complete search history.

(56) References Cited

U.S. PATENT DOCUMENTS

| | | | | | |
|---|---|---|---|---|---|
| 1,931,796 | A | * | 10/1933 | Hoffman | E05D 15/063 16/98 |
| 2,135,613 | A | | 11/1938 | Orlow | |
| 2,761,172 | A | * | 9/1956 | Jorgensen | E05D 15/063 16/105 |
| 3,829,929 | A | * | 8/1974 | Foltz | E05D 15/063 16/97 |
| 4,371,356 | A | * | 2/1983 | Dore | F16D 3/2055 464/111 |
| 4,457,046 | A | * | 7/1984 | Vater | E05D 15/063 105/155 |
| 4,750,237 | A | * | 6/1988 | Johnston | E05D 15/063 16/102 |

(Continued)

FOREIGN PATENT DOCUMENTS

EP        1914099        4/2008

*Primary Examiner* — Howard J Sanders
*Assistant Examiner* — Gregory T Prather
(74) *Attorney, Agent, or Firm* — Patrick Sheldrake; Peter Zacharias (57) ABSTRACT A roller assembly for a hood actuation system includes a mounting block and a fastener having a shaft extending through the mounting block. The fastener is configured to couple the mounting block to an actuator of the hood actuation system. The roller assembly also includes at least one driving roller. The shaft of the fastener extends through an opening in the at least one driving roller to couple the at least one driving roller to the mounting block.

19 Claims, 10 Drawing Sheets (56) References Cited

U.S. PATENT DOCUMENTS

| | | | | |
|---|---|---|---|---|
| 5,035,025 | A * | 7/1991 | Morris | E04B 2/827 |
| | | | | 16/95 R |
| 5,890,556 | A * | 4/1999 | Shearn | B62D 25/12 |
| | | | | 16/273 |
| 5,895,089 | A * | 4/1999 | Singh | B60J 5/06 |
| | | | | 16/86 B |
| 6,209,171 | B1 * | 4/2001 | Pelletier | E05D 15/063 |
| | | | | 16/87 R |
| 6,463,625 | B2 * | 10/2002 | Mittag | E05D 15/0639 |
| | | | | 16/105 |
| 6,983,512 | B2 * | 1/2006 | De Oliveira | E05D 15/063 |
| | | | | 16/87 R |
| 8,499,871 | B2 | 8/2013 | Renard et al. | |
| 9,032,589 | B2 | 5/2015 | Pelekanos | |
| 2018/0334119 | A1 * | 11/2018 | Miyamoto | E02F 9/00 |
| 2018/0355646 | A1 * | 12/2018 | Revelis | E05D 5/062 |

* cited by examiner

ROLLER ASSEMBLY FOR A HOOD ACTUATION SYSTEM

BACKGROUND

The present disclosure relates generally to a roller assembly for a hood actuation system.

Typical work vehicles include a body configured to house certain components of the work vehicle, such as an engine, a transmission, other systems of the work vehicle (e.g., hydraulic system(s), electrical system(s), etc.), or a combination thereof. To facilitate access to the components, the body may include a hood (e.g., door) that moves (e.g., rotates) between a closed positioned that substantially blocks access to the components and an open position that facilitates access to the components. Certain work vehicles include an actuation system configured to move the hood between the closed and open positions. For example, the actuation system may include a roller assembly and an actuator. The roller assembly may be coupled to an end of the actuator and configured to engage a track assembly of the hood. Extension of the actuator may drive rollers of the roller assembly against tracks of the track assembly, thereby moving the hood to the open position. Unfortunately, the costs associated with constructing the actuation system (e.g., labor and component costs associated with coupling the roller assembly to the actuator) may increase the manufacturing costs of the work vehicle.

BRIEF DESCRIPTION

In one embodiment, a roller assembly for a hood actuation system includes a mounting block and a fastener having a shaft extending through the mounting block. The fastener is configured to couple the mounting block to an actuator of the hood actuation system. The roller assembly also includes at least one driving roller. The shaft of the fastener extends through an opening in the at least one driving roller to couple the at least one driving roller to the mounting block.

In another embodiment, a roller assembly for a hood actuation system includes a mounting block and a fastener having a shaft extending through the mounting block. The roller assembly also includes a first driving roller. The shaft of the fastener extends through an opening in the first driving roller to couple the first driving roller to the mounting block. In addition, the roller assembly includes a first bearing sleeve disposed about the shaft of the fastener and within the opening in the first driving roller. The first bearing sleeve has a first end configured to engage a first contact surface of the mounting block and a second end, opposite the first end, configured to engage a contact surface of a first blocking element of the fastener.

In a further embodiment, a roller assembly for a hood actuation system includes a mounting block having a passage extending from a first lateral side of the mounting block to a second lateral side of the mounting block, opposite the first lateral side. The roller assembly also includes a fastener having a shaft extending through an entire extent of the passage. In addition, the roller assembly includes a first driving roller. The shaft of the fastener extends through an opening in the first driving roller to couple the first driving roller to the mounting block. The roller assembly also includes a first bearing sleeve disposed about the shaft of the fastener and within the opening in the first driving roller.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
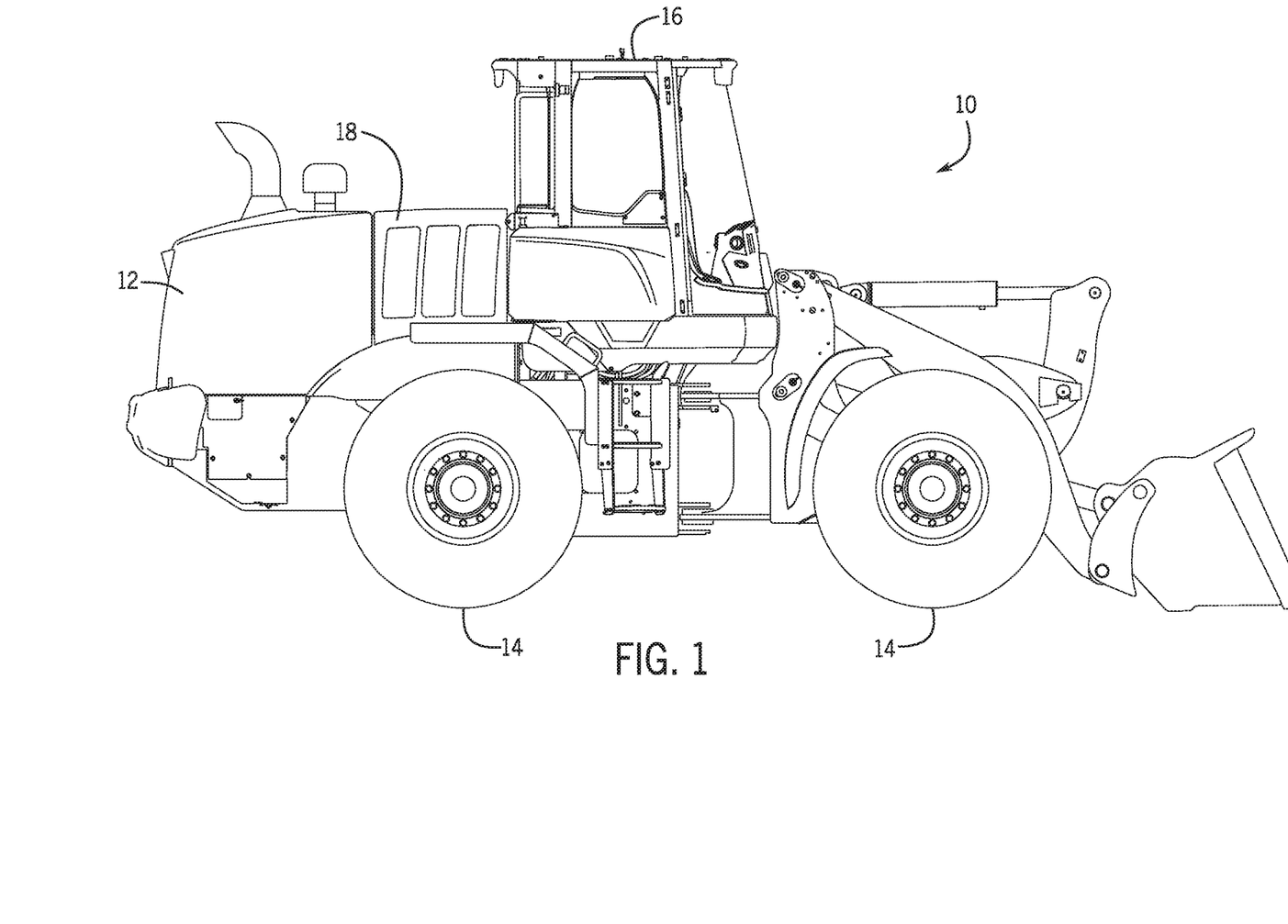
FIG. 1 is a side view of an embodiment of a work vehicle that may include a hood actuation system.

Turning now to the drawings, FIG. 1 is a side view of an embodiment of a work vehicle 10 that may include a hood actuation assembly. In the illustrated embodiment, the work vehicle 10 includes a body 12 configured to house certain components of the work vehicle, such as an engine, a transmission, other systems (e.g., hydraulic system(s), electrical system(s), etc.) of the work vehicle 10, or a combination thereof. In addition, the work vehicle 10 includes wheels 14 configured to be driven by the engine and transmission, thereby driving the work vehicle 10 along a field, a road, or any other suitable surface. The work vehicle 10 also includes a cab 16 configured to house an operator, and a hood 18 configured to selectively facilitate access to certain components within the body 12 (e.g., the engine, the transmission, etc.). In certain embodiments, the hood 18 is configured to rotate between a closed position that substantially blocks access to the components and an open position that facilitates access to the components.

As discussed in detail below, the work vehicle may include a hood actuation system configured to move the hood between the closed and open positions. In certain embodiments, the hood actuation system includes a roller assembly having a mounting block. The roller assembly also includes a fastener having a shaft extending through the mounting block, and a driving roller. The shaft of the fastener extends through an opening in the driving roller to couple the driving roller to the mounting block. In certain embodiments, the fastener is configured to couple the mounting block to an actuator of the hood actuation system. Because the fastener couples the driving roller to the mounting block and the mounting block to the actuator, the complexity of the actuation system may be reduced, as compared to an actuation system that includes a first fastener configured to couple the driving roller to the mounting block and a second fastener configured to couple the mounting block to the actuator. As a result, the duration and component costs associated with assembling the actuation system may be reduced, thereby reducing the manufacturing costs of the work vehicle.

Furthermore, in certain embodiments, a bearing sleeve is disposed about the shaft of the fastener and within the opening in the driving roller. The bearing sleeve may substantially reduce or eliminate the possibility of the driving roller becoming pinched between the mounting block and a blocking element (e.g., nut, pin, etc.) on an opposite lateral side of the driving roller from the mounting block. Accordingly, the actuator may apply less force to drive the hood from the closed position to the open position, as compared to a roller assembly in which the driving roller is disposed directly onto the shaft of the fastener. As a result, the power consumption of the actuator may be reduced, and/or the longevity of the actuator may be enhanced.

Figure 2:
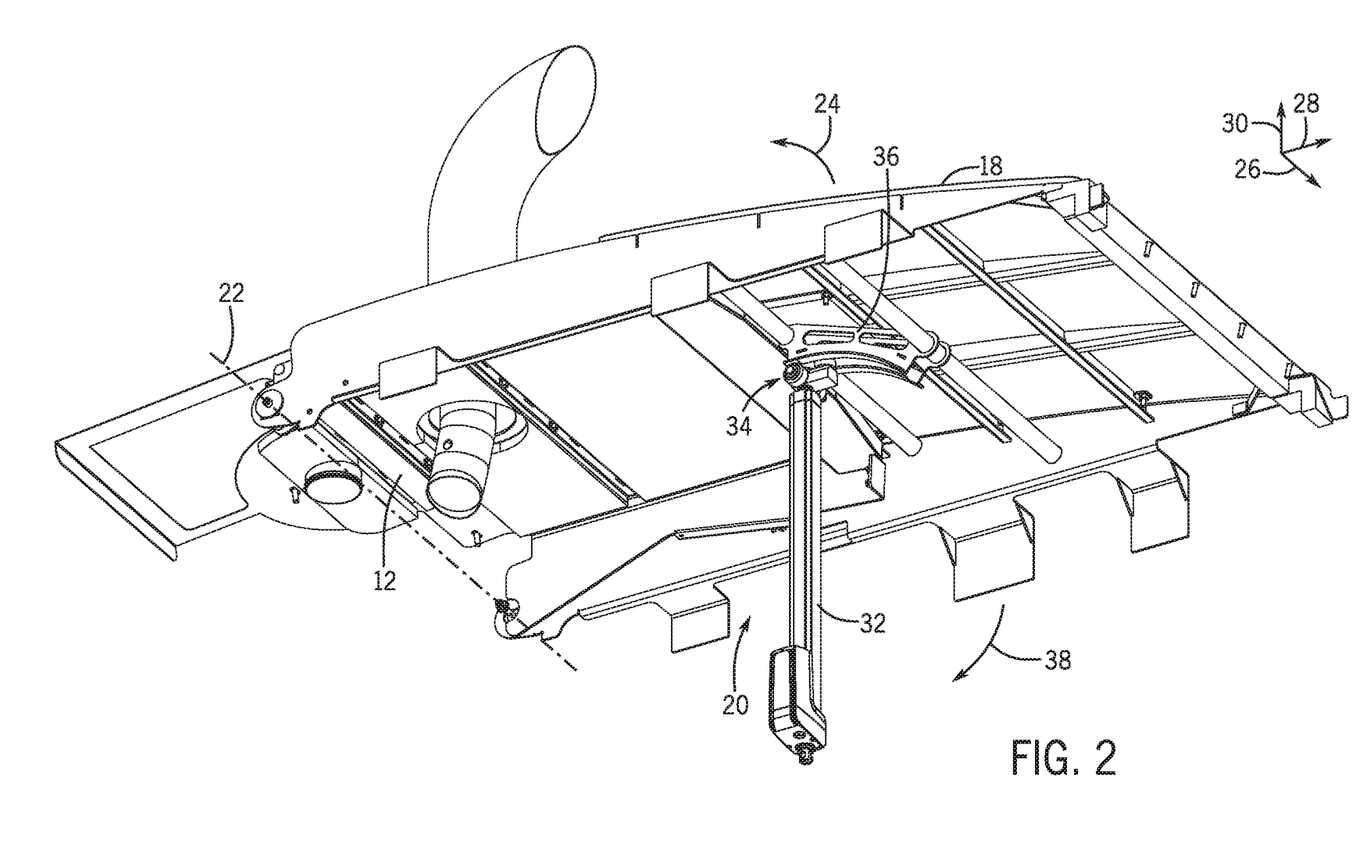
FIG. 2 is a perspective view of an embodiment of a hood and an embodiment of a hood actuation system configured to move the hood between closed and open positions.

FIG. 2 is a perspective view of an embodiment of a hood 18 and an embodiment of a hood actuation system 20 configured to move the hood 18 between closed and open positions. In the illustrated embodiment, the hood 18 is configured to rotate between the illustrated closed position and an open position. With the hood 18 in the illustrated closed position, access to components within an interior of the body 12 is substantially blocked. The hood 18 is configured to rotate about a rotation axis 22 in an upward direction 24 between the illustrated closed position and the open position. In the illustrated embodiment, the rotation axis 22 is substantially parallel to a lateral axis 26 of the work vehicle. However, it should be appreciated that in alternative embodiments, the hood may be configured to rotate about a rotation axis parallel to a longitudinal axis 28 of the work vehicle, about a rotation axis parallel to a vertical axis 30 of the work vehicle, or about a rotation axis oriented at any suitable angle relative to one or more of the axes. Furthermore, while the illustrated hood 18 is configured to rotate upwardly from the illustrated closed position to the open position, it should be appreciated that in alternative embodiments, the hood may be configured to rotate downwardly from the closed position to the open position, or the hood may rotate in any other suitable direction between the open and closed positions.

The actuation system 20 is configured to drive the hood 18 between the open and closed positions. In the illustrated embodiment, the actuation system 20 includes an actuator 32 and a roller assembly 34. As discussed in detail below, rollers of the roller assembly 34 are configured to engage tracks of a track assembly 36 as the actuator 32 extends, thereby driving the hood 18 from the illustrated closed position to the open position. In addition, as the actuator 32 retracts, the hood 18 is lowered from the open position to the closed position (e.g., as gravitational force drives the tracks to maintain contact with the rollers). In certain embodiments, a fastener of the roller assembly 34, which extends through a slot in the track assembly 36, is configured to engage a contact surface of the track assembly to drive the hood in a downward direction 38 while the hood is in the illustrated closed position, thereby substantially reducing movement (e.g., vibration) of the hood while the hood is in the closed position. While the illustrated embodiment includes a linear actuator, it should be appreciated that in alternative embodiments, the actuation system may include any other suitable type of actuator, such as a hydraulic cylinder or a pneumatic cylinder, among others.

Figure 3:
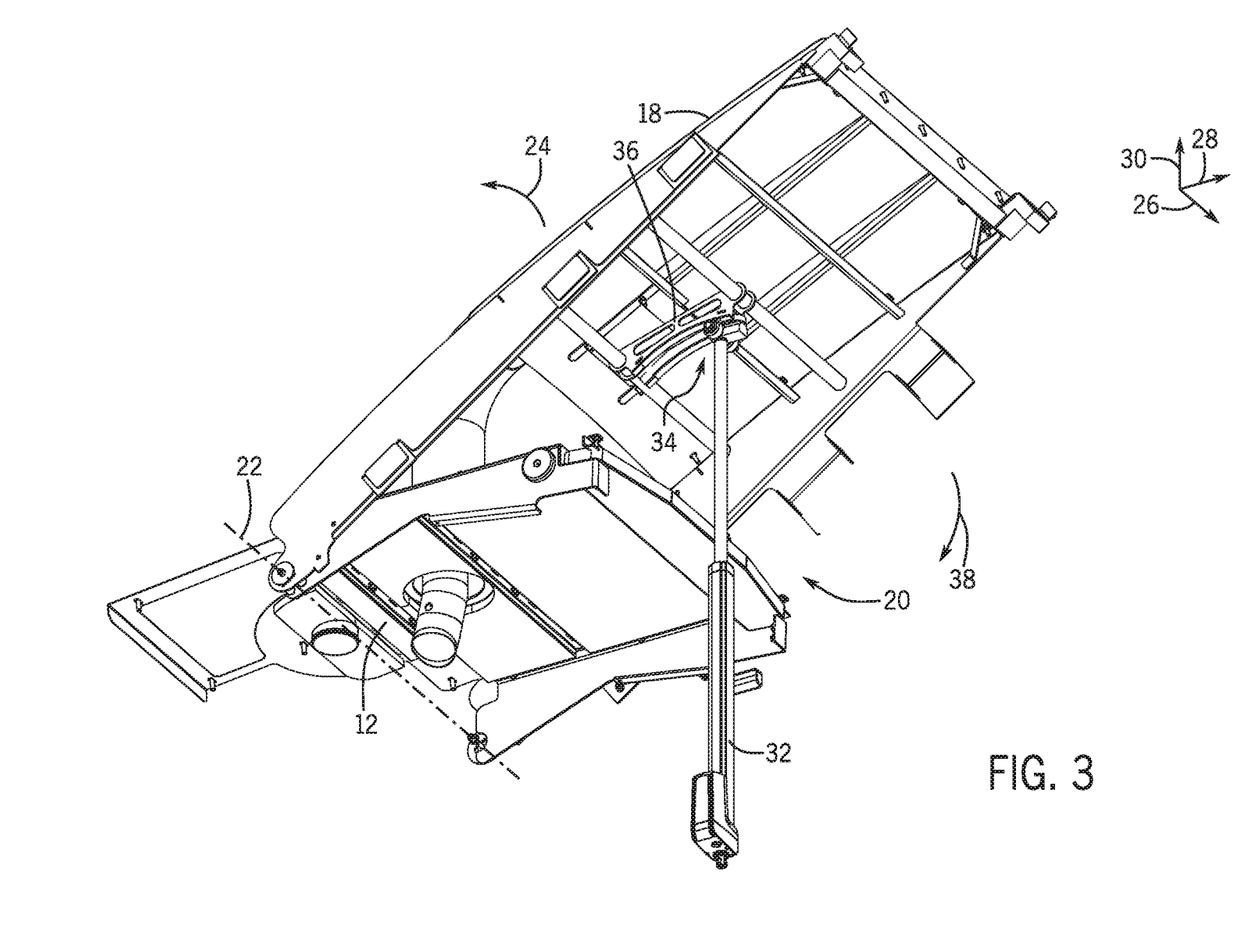
FIG. 3 is a perspective view of the hood and hood actuation system of FIG. 2, in which the hood is in the open position.

FIG. 3 is a perspective view of the hood 18 and hood actuation system 20 of FIG. 2, in which the hood 18 is in the open position. As previously discussed, extension of the actuator 32 to the illustrated extended position drives the hood 18 to rotate about the rotation axis 22 to the illustrated open position, thereby enabling a user to access an interior of the body 12. To facilitate a smooth transition between the closed and open positions, the track assembly 36 includes curved tracks, and rollers of the roller assembly 34 move along the curved tracks as the hood rotates about the rotation axis 22. While the actuation system is described herein with reference to a hood, it should be appreciated that the actuation system may be utilized to move other suitable components of the work vehicle, such as a door or a panel, among others.

Figure 4:
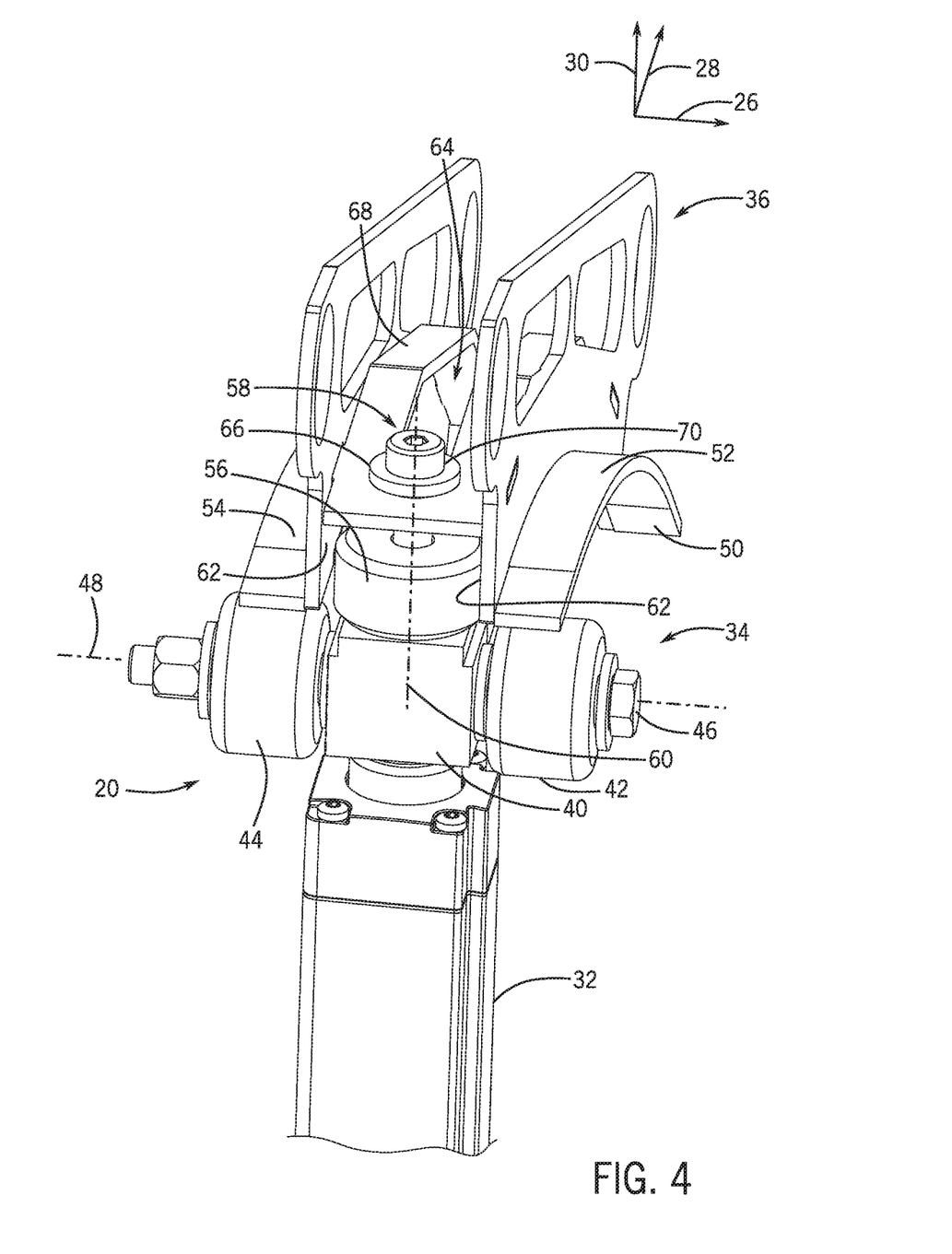
FIG. 4 is a perspective view of the hood actuation system of FIG. 2, in which a roller assembly of the hood actuation system is engaged with a track assembly.

FIG. 4 is a perspective view of the hood actuation system 20 of FIG. 2, in which the roller assembly 34 is engaged with the track assembly 36. In the illustrated embodiment, the roller assembly 34 includes a mounting block 40, a first driving roller 42, and a second driving roller 44. The second driving roller 44 is positioned on an opposite side of the mounting block 40 from the first driving roller 42 along the lateral axis 26. The first and second driving rollers 42 and 44 are rotatably coupled to the mounting block 40 by a fastener 46, and a shaft of the fastener 46 extends through respective openings of the first and second driving rollers 42 and 44 to facilitate rotation of the driving rollers about a rotation axis 48. In the illustrated embodiment, the rotation axis 48 is substantially parallel to the lateral axis 26. However, it should be appreciated that in alternative embodiments, the rotation axis may be oriented at any suitable angle relative to the longitudinal, lateral, and vertical axes. The first driving roller 42 is configured to engage a contact surface 50 of a first rail 52 of the rail assembly 36, and the second driving roller 44 is configured to engage a contact surface of a second rail 54 of the rail assembly 36. Accordingly, extension of the actuator 32 along the vertical axis 30 drives the driving rollers 42 and 44 into engagement with the respective rails 52 and 54, thereby driving the hood upwardly from the closed position to the open position.

In the illustrated embodiment, the roller assembly 34 includes a first guidance roller 56 rotatably coupled to the mounting block 40 by a fastener 58. The fastener 58 includes a shaft extending through an opening in the first guidance roller 56, thereby facilitating rotation of the first guidance roller 56 about a rotation axis 60. The first guidance roller 56 is configured to engage contact surfaces 62 of the track assembly 36 on opposite lateral sides of the first guidance roller 56, thereby substantially blocking movement of the roller assembly 34 relative to the track assembly 36 along the lateral axis 26. Accordingly, movement (e.g., vibration) of the hood relative to the body along the lateral axis may be substantially reduced.

As illustrated, the fastener 58 extends through a slot 64 in the track assembly 36, and the washer 66, which is coupled to the fastener 58, is configured to engage a contact surface 68 of the track assembly 36. While the driving rollers 42 and 44 are engaged with the respective tracks 52 and 54, a head 70 of the fastener 58 (e.g., bolt) may be positioned a sufficient distance above the contact surface 68 such that the head 70 does not apply a force against the washer 66. However, with the hood in the closed position, retraction of the actuator 32 drives the roller assembly downwardly along the vertical axis 30. As a result, the driving rollers 42 and 44 disengage the tracks 52 and 54, and the head 70 of the fastener 58 drives the washer 66 into engagement with the contact surface 68, as illustrated. As a result, the possibility of the hood moving (e.g., vibrating) along the vertical axis 32 while the hood is in the closed position is substantially reduced or eliminated.

Figure 5:
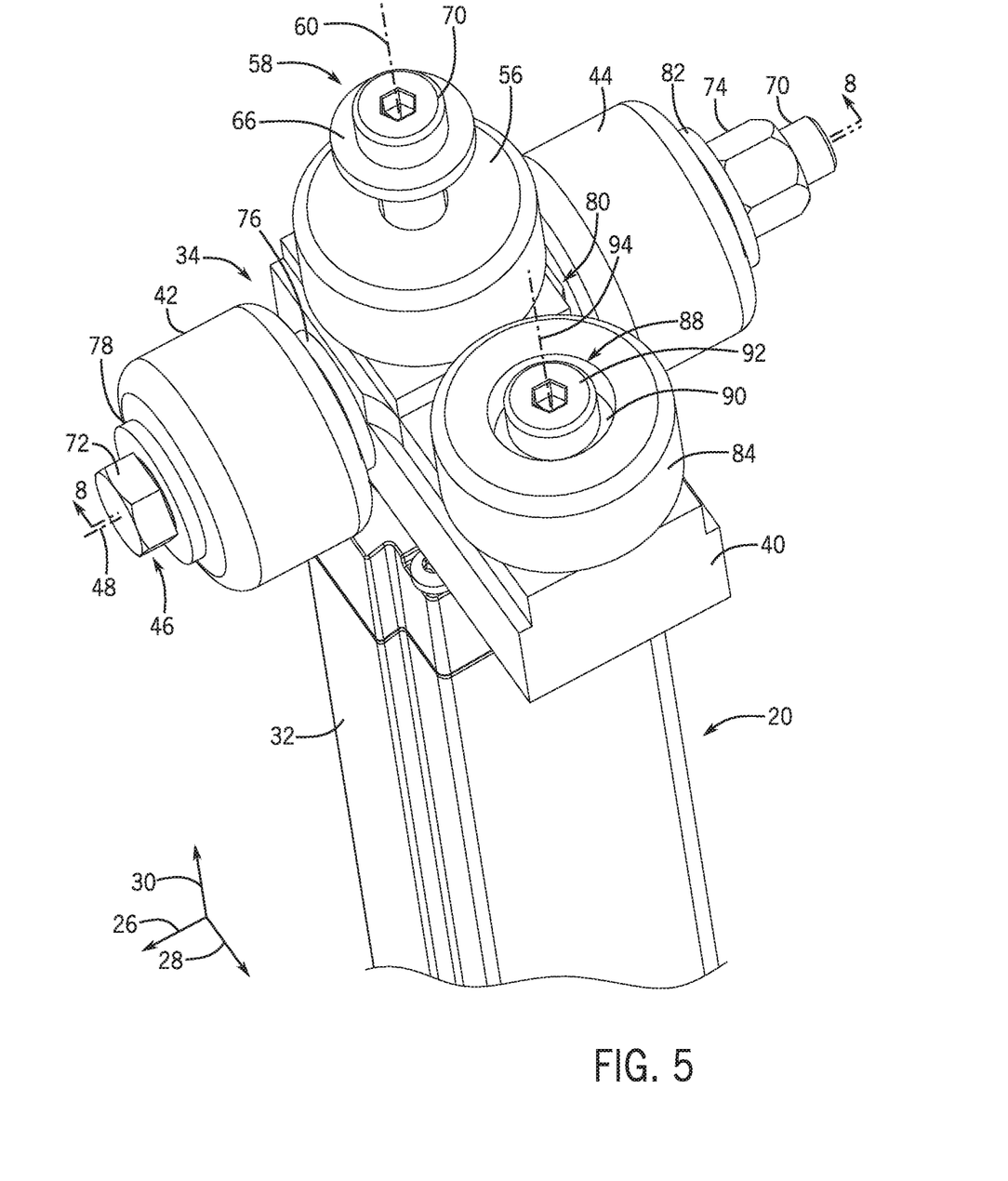
FIG. 5 is a perspective view of the hood actuation system of FIG. 2.

FIG. 5 is a perspective view of the hood actuation system 20 of FIG. 2. As previously discussed, the hood actuation system 20 includes the actuator 32 and the roller assembly 34 coupled to the actuator 32. In the illustrated embodiment, the roller assembly 34 includes the mounting block 40 and the fastener 46 having a shaft 70 extending through the mounting block 40. In addition, the shaft 70 of the fastener 46 extends through an opening in the first driving roller 42 and the second driving roller 44 to couple the first and second driving rollers 42 and 44 to the mounting bock 40. In the illustrated embodiment, the fastener 46 includes a head 72 at one end of the shaft 70 and a nut 74 positioned on the other end of the shaft 70. In addition, a first washer 76 is disposed between the first driving roller 42 and the mounting block 40, and a second washer 78 is disposed on an opposite side of the first driving roller 42 from the first washer 76 along the lateral axis 26. Accordingly, the second washer 78 is disposed between the first driving roller 42 and the head 72 of the fastener 46. Furthermore, a third washer 80 is disposed between the second driving roller 44 and the mounting block 40, and a fourth washer 82 is disposed on an opposite side of the second driving roller 44 from the third washer 80 along the lateral axis 26. Accordingly, the fourth washer 82 is disposed between the first driving roller 44 and the nut 74. The washers are configured to distribute lateral loads over a larger area of the driving rollers, thereby facilitating rotation of the driving rollers about the shaft 70 of the fastener 46.

In the illustrated embodiment, the fastener 46 includes the head 72, and the shaft 70 includes a threaded portion configured to receive the nut 74. Accordingly, while the nut 74 is coupled to the shaft 70, the fastener 46 couples the driving rollers 42 and 44 to the mounting block 40. However, it should be appreciated that in alternative embodiments, another blocking element may be disposed on each end of the fastener to couple the driving rollers to the mounting block. For example, at least one end of the fastener may include an opening configured to receive a pin, and the pin may be configured to block lateral movement of at least one driving roller away from the mounting block along the shaft. Furthermore, at least one end of the fastener may include a slot configured to receive a clip, or any other suitable mount configured to receive a respective blocking element configured to block lateral movement of at least one driving roller away from the mounting block along the shaft.

As previously discussed, the roller assembly 34 includes the first guidance roller 56 rotatably coupled to the mounting block 40 by the fastener 58. In addition, the roller assembly 34 includes a second guidance roller 84 rotatably coupled to the mounting block 40 by a fastener 88. In the illustrated embodiment, a washer 90 is disposed between a head 92 of the fastener 88 and the second guidance roller 84. The fastener 88 includes a shaft extending through an opening in the second guidance roller 84, thereby facilitating rotation of the second guidance roller 84 about a rotation axis 94. The second guidance roller 84 is configured to engage the contact surfaces of the track assembly on opposite lateral sides of the second guidance roller, thereby substantially blocking movement of the roller assembly relative to the track assembly along the lateral axis. Accordingly, movement (e.g., vibration) of the hood relative to the body along the lateral axis may be substantially reduced. In the illustrated embodiment, the rotation axis 60 of the first guidance roller 56 and the rotation axis 94 of the second guidance roller 84 are substantially parallel to the vertical axis 30. However, it should be appreciated that in alternative embodiments, the rotation axis of at least one guidance roller may be oriented at any suitable angle relative to the vertical axis, the longitudinal axis, the lateral axis, or a combination thereof.

While the illustrated embodiment includes two driving rollers and two guidance rollers, it should be appreciated that alternative embodiments may include more or fewer driving roller and/or guidance rollers. For example, in certain embodiments, the roller assembly may include more or fewer driving rollers on each lateral side of the mounting block (e.g., 0, 1, 2, 3, 4, or more). In addition, in certain embodiments, the roller assembly may include more or fewer driving rollers (e.g., 0, 1, 2, 3, 4, or more). The rollers may be formed from any suitable material, such as low coefficient of friction polymeric material, among others.

Figure 6:
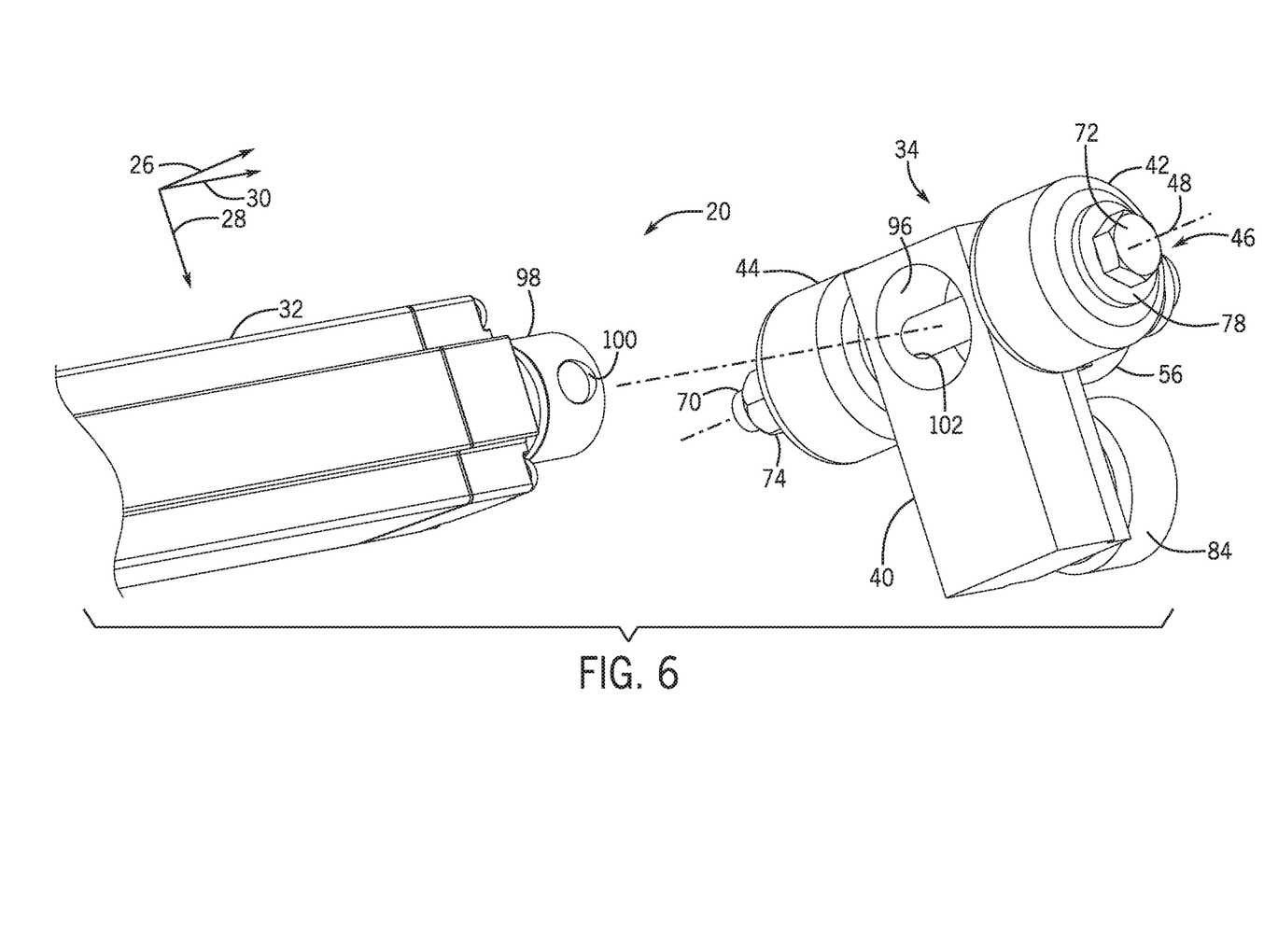
FIG. 6 is an exploded view of the hood actuation system of FIG. 2.

FIG. 6 is an exploded view of the hood actuation system 20 of FIG. 2. In the illustrated embodiment, the mounting block 40 has a recess 96 configured to receive a mounting portion 98 of the actuator 32. The mounting portion 98 of the actuator 32 includes an aperture 100 configured to receive the shaft 70 of the fastener 46. Accordingly, to couple the actuator 32 to the roller assembly 34, the mounting portion 98 of the actuator 32 is disposed within the recess 96 of the mounting block 40. Openings 102 in the mounting block 40 are aligned with the aperture 100 in the mounting portion 98, and openings in the driving rollers and washers are aligned with the openings 102 in the mounting block 40. The shaft 70 is then disposed through the openings in the driving rollers, the openings in the washers, the openings 102 in the mounting block, and the aperture 100 in the mounting portion 98, and the nut 74 is coupled to the threaded portion of the shaft 70. Accordingly, the driving rollers, the washers, and the actuator are coupled to the mounting block with a single fastener, thereby substantially reducing the cost of the actuation system, as compared to actuation systems that utilize separate fasteners for the washers/driving rollers and the actuator. For example, reducing the number of fasteners may reduce the component costs of the actuation system, and/or utilizing a single fastener may reduce the duration of the assembly process, thereby reducing manufacturing costs.

While the mounting portion 98 of the actuator 32 is disposed within the recess 96 of the mounting block 40, contact between the mounting portion 98 and the mounting block 40 substantially blocks movement of the roller assembly 34 relative to the actuator 32 along the lateral axis 26 and along the longitudinal axis 28. In addition, contact between the shaft 70 of the fastener 46 and the mounting portion 98 of the actuator 32 substantially blocks movement of the roller assembly 34 relative to the actuator 32 along the vertical axis 30. While the illustrated mounting portion 98 and recess 96 have a substantially circular cross-section, it should be appreciated that in alternative embodiments, the mounting portion and the recess may have any other suitable cross-sectional shape (e.g., elliptical, polygonal, star-shaped, etc.).

Furthermore, while movement of the roller assembly 34 relative to the actuator 32 along the vertical axis 30 is blocked by contact between the shaft 70 and the mounting portion 98, it should be appreciated that in alternative embodiments, the vertical movement may be blocked by another suitable type of fastening system. For example, in certain embodiments, an interior surface of the recess may have threads, and the mounting portion of the actuator may have corresponding threads.

Accordingly, the actuator may be coupled to the roller assembly by engaging the threaded mounting portion with the threaded recess. As a result, movement of the roller assembly relative to the actuator along the vertical axis may be blocked. In such embodiments, the shaft of the fastener may not extend through the mounting portion. In certain embodiments, a nut may be engaged with the threads of the mounting portion and rotated into engagement with a surface of the mounting block surrounding the recess. As a result, the possibility of the mounting portion disengaging the recess in response to rotation of the mounting block may be substantially reduced or eliminated.

Figure 7:
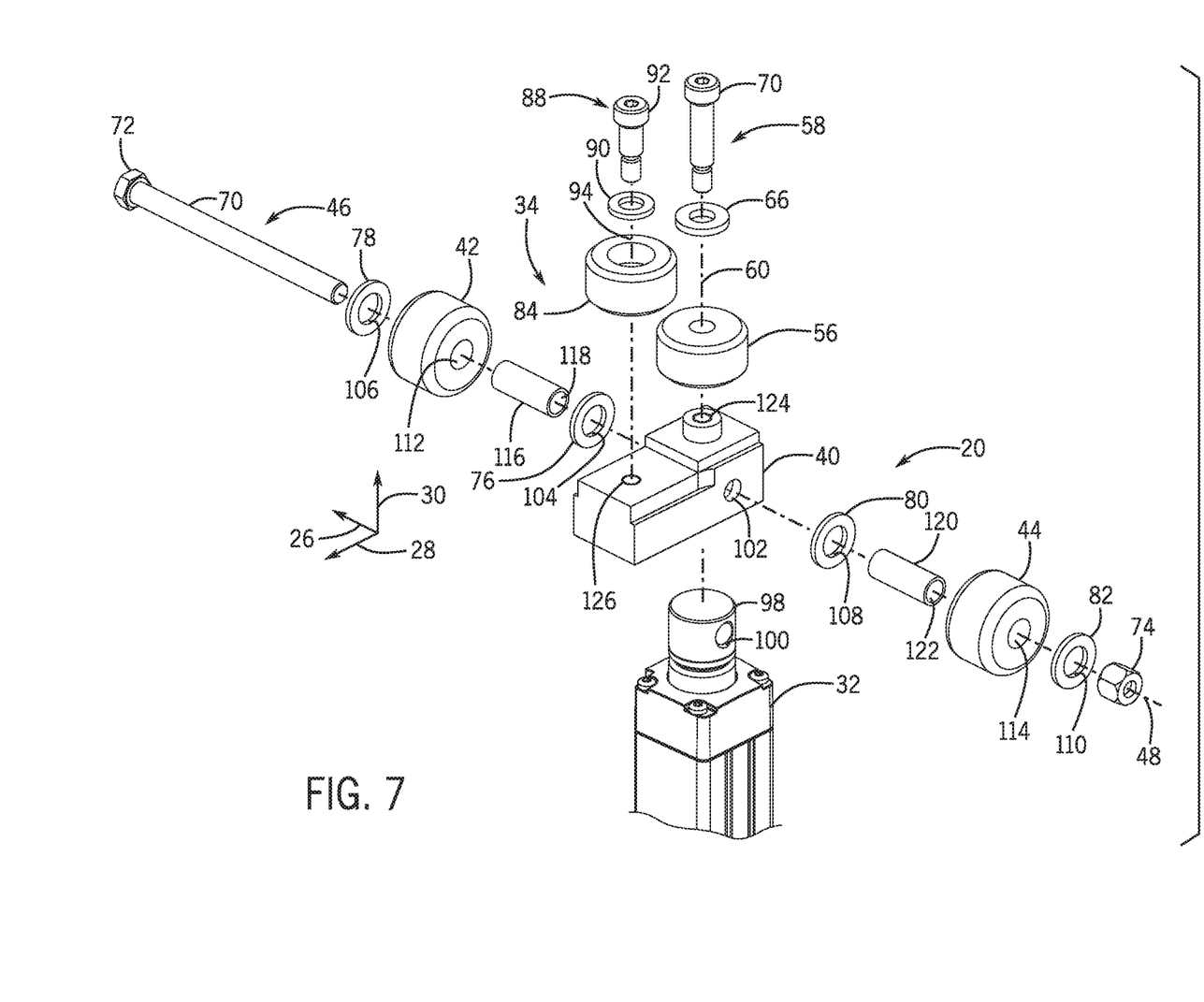
FIG. 7 is an exploded view of the roller assembly of the hood actuation system of FIG. 2.

FIG. 7 is an exploded view of the roller assembly 34 of the hood actuation system 20 of FIG. 2. As previously discussed, the washers, the driving rollers, and the actuator 32 are coupled to the mounting block 40 by the fastener 46. As illustrated, the shaft 70 of the fastener 46 extends through an opening 104 in the first washer 76, through an opening 106 in the second washer 78, through an opening 108 in the third washer 80, and through an opening 110 in the fourth washer 82, thereby rotatably coupling each washer to the mounting block 40. In addition, the shaft 70 of the fastener 46 extends through an opening 112 in the first driving roller 42 and through an opening 114 in the second driving roller 42, thereby rotatably coupling each driving roller to the mounting block 40. Furthermore, the shaft 70 of the fastener 46 extends through the aperture 100 in the mounting portion 98 to couple the actuator 32 to the mounting block 40. The shaft 70 of the fastener 46 also extends through the openings 102 in the mounting block 40, which form a passage that extends from a first lateral side of the mounting block to a second lateral side of the mounting block, opposite the first lateral side. Accordingly, the shaft 70 extends through an entire extent of the passage. Because the driving rollers, the washers, and the actuator are coupled to the mounting block with a single fastener, the cost of the actuation system may be substantially reduced, as compared to actuation systems that utilize separate fasteners for the washers/driving rollers and the actuator.

In the illustrated embodiment, the roller assembly 34 includes a first bearing sleeve 116 disposed about the shaft 70 of the fastener 46 and within the opening 112 in the first driving roller 42. As illustrated, the shaft 70 extends through a passage 118 of the first bearing sleeve 116 to couple the first bearing sleeve 116 to the shaft 70 of the fastener 46. In addition, the roller assembly 34 includes a second bearing sleeve 120 disposed about the shaft 70 of the fastener 46 and within the opening 114 in the second driving roller 44. As illustrated, the shaft 70 extends through a passage 122 of the second bearing sleeve 120 to couple the second bearing sleeve 120 to the shaft 70 of the fastener 46. Each bearing sleeve is configured to facilitate rotation of the respective driving roller. For example, the outer surface of at least one bearing sleeve (e.g., the surface in contact with the respective driving roller) may have a surface roughness of about 0.5 Ra to about 1.0 Ra, about 0.6 Ra to about 0.9 Ra, or about 0.8 Ra, thereby reducing friction between the outer surface of the bearing sleeve and the respective driving roller. In addition, as discussed in detail below, the compression force applied by the nut 74 may flow through the bearing sleeves, instead of through the driving rollers. As a result, the possibility of each driving roller becoming pinched between the laterally inward washer and the laterally outward washer may be substantially reduced or eliminated.

In certain embodiments, at least one bearing sleeve may be formed from stainless steel to substantially reduce corrosion, thereby substantially maintaining the low friction interface between the outer surface of the bearing sleeve and the respective driving roller. While the illustrated embodiment includes two bearing sleeves, it should be appreciated that alternative embodiments may include more or fewer bearing sleeves. For example, in certain embodiments, at least one bearing sleeve may be omitted, and the corresponding driving roller may be disposed directly about the shaft of the fastener. In further embodiments, the roller assembly may include more than two driving rollers and a corresponding number of bearing sleeves.

In the illustrated embodiment, the first guidance roller 56 is rotatably coupled to the mounting block 40 by the fastener 58. The fastener 58 is configured to engage a corresponding recess 124 in the mounting block 40 to couple the fastener and the first guidance roller to the mounting block. For example, the fastener may include a threaded end configured to engage corresponding threads within the recess. Furthermore, the second guidance roller 84 is rotatably coupled to the mounting block 40 by the fastener 88. The fastener 88 is configured to engage a corresponding recess 126 in the mounting block 40 to couple the fastener and the second guidance roller to the mounting block. For example, the fastener may include a threaded end configured to engage corresponding threads within the recess.

Figure 8:
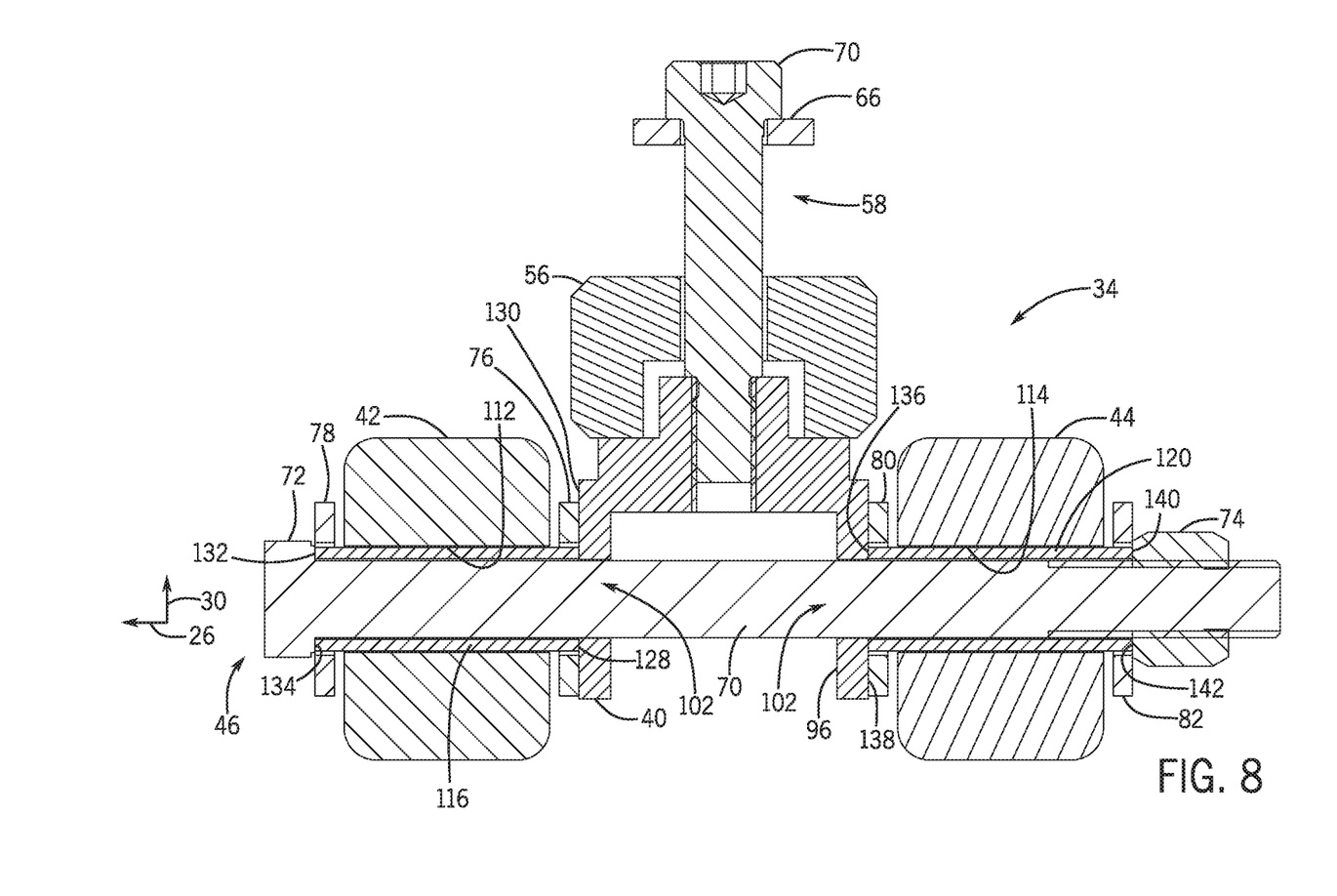
FIG. 8 is a cross-sectional view of the roller assembly of the hood actuation system of FIG. 2, taken along line 8-8 of FIG. 5.

FIG. 8 is a cross-sectional view of the roller assembly 34 of the hood actuation system of FIG. 2, taken along line 8-8 of FIG. 5. As previously discussed, the first bearing sleeve 116 is disposed about the shaft 70 of the fastener 46 and within the opening 112 in the first driving roller 42. As illustrated, the first bearing sleeve 116 has a first end 128 engaged with a first contact surface 130 of the mounting block 40 and a second end 132 engaged with a contact surface 134 of the head 72 (e.g., first blocking element) of the fastener 46. Accordingly, as the nut 74 is engaged with the threaded portion of the shaft 70, the first bearing sleeve 116 blocks movement of the head 72 toward the mounting block 40 along the lateral axis 26. As a result, the compression force applied by the nut 74 flows through the first bearing sleeve 116, instead of through the first driving roller 42 (e.g., because the lateral extent of the first bearing sleeve 116 is greater than the lateral extent of the first driving roller 42). While the first end 128 of the first bearing sleeve 116 is configured to directly engage the first contact surface 130 of the mounting block 40 in the illustrated embodiment, it should be appreciated that in alternative embodiments, the first end of the first bearing sleeve may be configured to indirectly engage the first contact surface via intermediate element(s), such as the first washer (e.g., in embodiments in which a diameter of the opening in the first washer is substantially equal to a diameter of the passage through the first bearing sleeve). Furthermore, while the second end 132 of the first bearing sleeve 116 is configured to directly engage the contact surface 134 of the head 72 in the illustrated embodiment, it should be appreciated that in alternative embodiments, the second end of the first bearing sleeve may be configured to indirectly engage the contact surface of the head via intermediate element(s), such as the second washer (e.g., in embodiments in which a diameter of the opening in the second washer is substantially equal to a diameter of the passage through the first bearing sleeve).

In addition, the second bearing sleeve 120 is disposed about the shaft 70 of the fastener 46 and within the opening 114 in the second driving roller 44. As illustrated, the second bearing sleeve 120 has a first end 136 engaged with a second contact surface 138 of the mounting block 40 and a second end 140 engaged with a contact surface 142 of the nut 74 (e.g., second blocking element) of the fastener 46. Accordingly, as the nut 74 is engaged with the threaded portion of the shaft 70, the second bearing sleeve 120 blocks movement of the nut 74 toward the mounting block 40 along the lateral axis 26. As a result, the compression force applied by the nut 74 flows through the second bearing sleeve 120, instead of through the second driving roller 44 (e.g., because the lateral extent of the second bearing sleeve 120 is greater than the lateral extent of the second driving roller 44). While the first end 136 of the second bearing sleeve 120 is configured to directly engage the second contact surface 138 of the mounting block 40 in the illustrated embodiment, it should be appreciated that in alternative embodiments, the first end of the second bearing sleeve may be configured to indirectly engage the second contact surface via intermediate element(s), such as the third washer (e.g., in embodiments in which a diameter of the opening in the third washer is substantially equal to a diameter of the passage through the second bearing sleeve). Furthermore, while the second end 140 of the second bearing sleeve 120 is configured to directly engage the contact surface 142 of the nut 74 in the illustrated embodiment, it should be appreciated that in alternative embodiments, the second end of the second bearing sleeve may be configured to indirectly engage the contact surface of the nut via intermediate element(s), such as the fourth washer (e.g., in embodiments in which a diameter of the opening in the fourth washer is substantially equal to a diameter of the passage through the second bearing sleeve).

Because the compression force applied by the nut may flow through the bearing sleeves, instead of through the driving rollers, the possibility of each driving roller becoming pinched between the laterally opposing washers may be substantially reduced or eliminated. Accordingly, the actuator may apply less force to drive the hood from the closed position to the open position, as compared to a roller assembly in which the driving roller is disposed directly onto the shaft of the fastener. As a result, the power consumption of the actuator may be reduced, and/or the longevity of the actuator may be enhanced.

Figure 9:
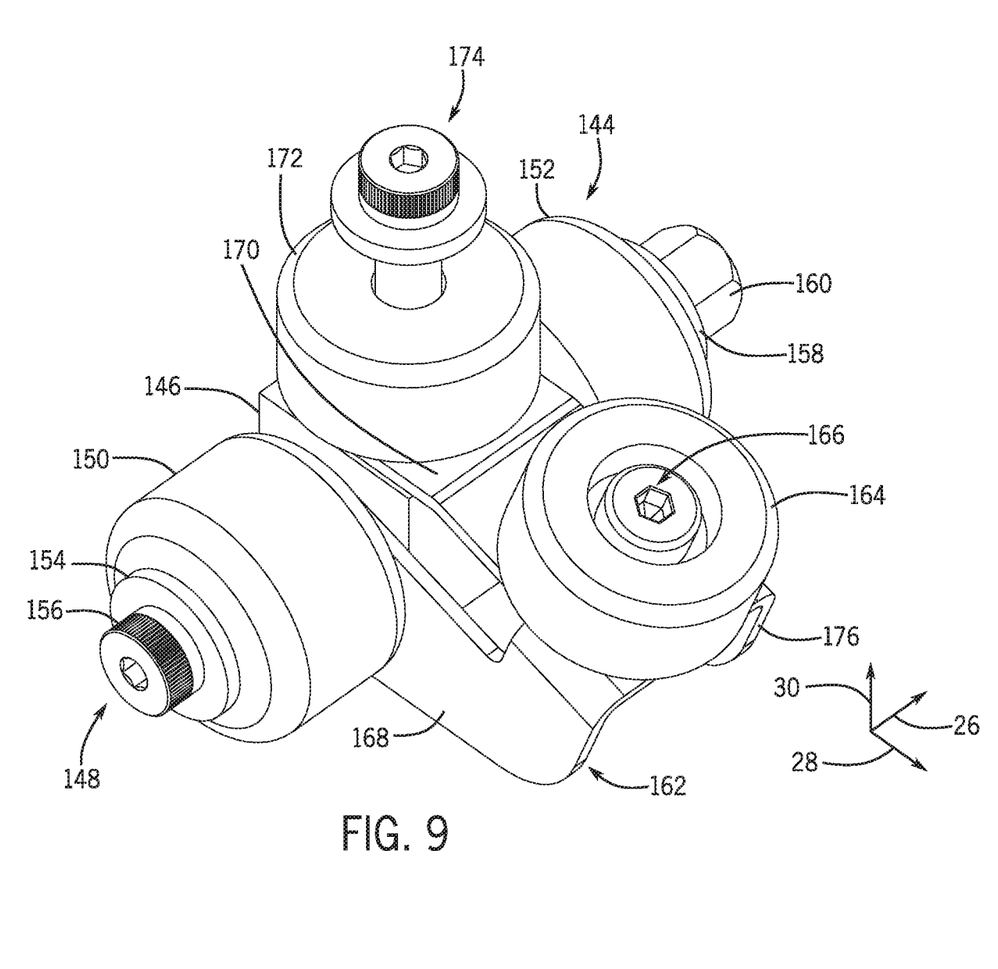
FIG. 9 is a perspective view of an alternative embodiment of a roller assembly.

FIG. 9 is a perspective view of an alternative embodiment of a roller assembly 144. In the illustrated embodiment, the roller assembly 144 includes a mounting block 146 and a fastener 148 having a shaft extending through the mounting block 146. The roller assembly 144 also includes a first driving roller 150 and a second driving roller 152. The shaft of the fastener 148 extends through respective openings in the first and second driving rollers, thereby coupling the driving rollers to the mounting block. In addition, the roller assembly 144 includes a first washer 154 disposed between a head 156 of the fastener 148 and the first driving roller 150. The shaft of the fastener 148 extends through an opening in the first washer 154 to rotatably couple the first washer 154 to the fastener 148. Furthermore, the roller assembly 144 includes a second washer 158 disposed between a nut 160 of the fastener 148 and the second driving roller 152. The shaft of the fastener 148 extends through an opening in the second washer 158 to rotatably couple the second washer 158 to the fastener 148.

In the illustrated embodiment, the roller assembly 144 includes a bracket assembly 162 coupled to the mounting block 146. In addition, the roller assembly 144 includes a first guidance roller 164 rotatably coupled to the bracket assembly 162 by a fastener 166. As illustrated, the bracket assembly 162 includes a first arm 168 disposed between the first driving roller 150 and the mounting block 146. As discussed in detail below, the first arm 164 includes an opening, and the shaft of the fastener 148 extends through the opening to couple the bracket assembly 162 to the mounting block 146. Furthermore, the bracket assembly 162 includes a second arm 170 disposed between a second guidance roller 172 and the mounting block 146. The second guidance roller 172 is rotatably coupled to the mounting block 146 by a fastener 174, and a shaft of the fastener 174 extends through an opening in the second arm 170 to couple the bracket assembly 162 to the mounting block 146. In addition, the bracket assembly 162 includes a third arm 176 disposed between the second driving roller 152 and the mounting block 146. The third arm 176 includes an opening, and the shaft of the fastener 148 extends through the opening to couple the bracket assembly 162 to the mounting block 146. Because the first and third arms of the bracket assembly 162 are disposed between respective driving rollers and the mounting block 146, the laterally inward washers of the embodiment disclosed with reference to FIGS. 5-8 are obviated. However, it should be appreciated that in certain embodiments, one or more washers may be disposed between the mounting block and a respective driving roller (e.g., between the driving roller and the arm and/or between the arm and the mounting block).

Figure 10:
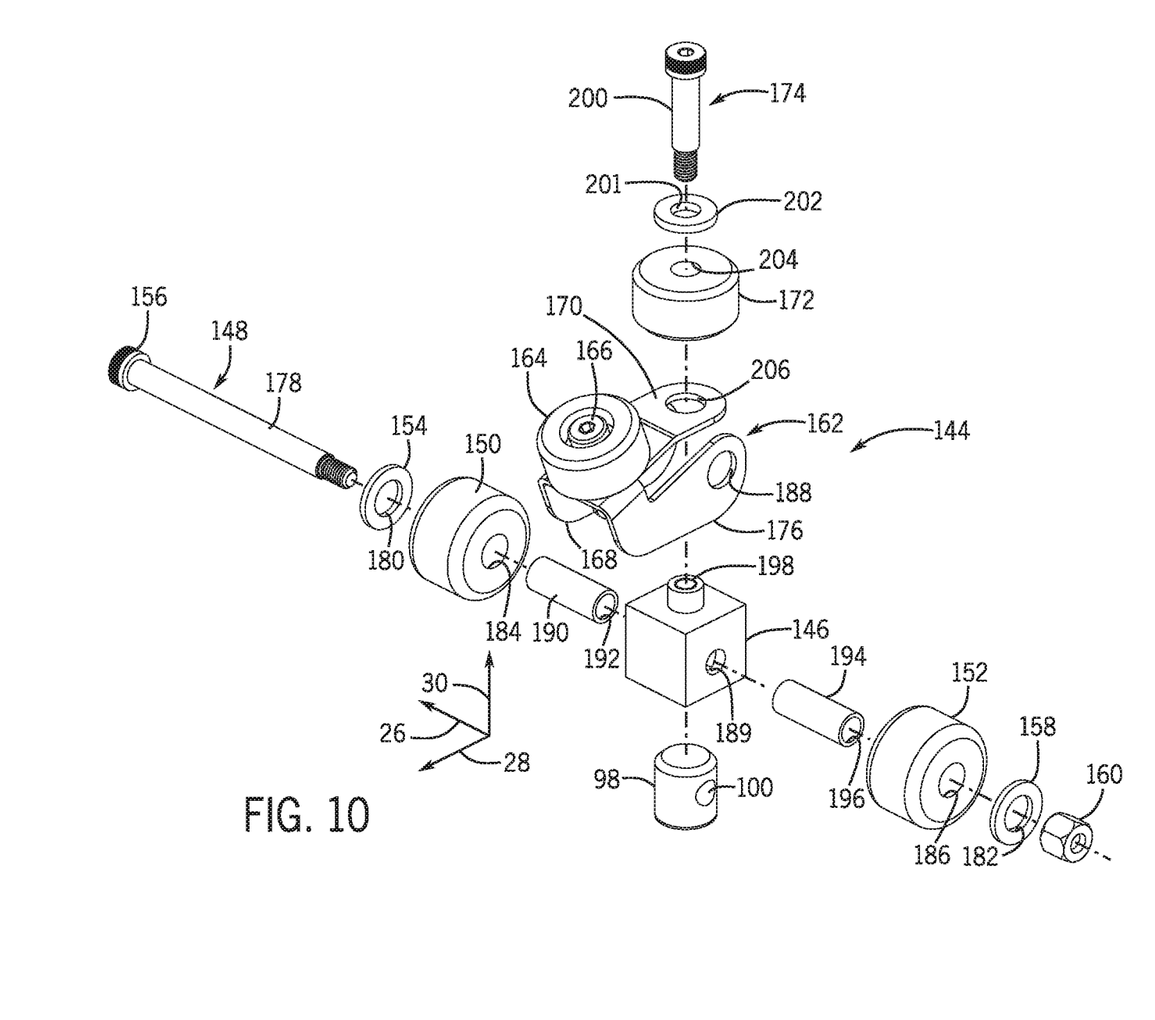
FIG. 10 is an exploded view of the roller assembly of FIG. 9.

FIG. 10 is an exploded view of the roller assembly 144 of FIG. 9. In the illustrated embodiment, the driving rollers and the actuator are coupled to the mounting block 146 by the fastener 148. As illustrated, a shaft 178 of the fastener 148 extends through an opening 180 in the first washer 154 and through an opening 182 in the second washer 158, thereby rotatably coupling each washer to the mounting block 146. In addition, the shaft 178 of the fastener 148 extends through an opening 184 in the first driving roller 150 and through an opening 186 in the second driving roller 152, thereby rotatably coupling each driving roller to the mounting block 146. Furthermore, the shaft 178 of the fastener 148 extends through an opening in the first arm 168 of the bracket assembly 162 and through an opening 188 in the third arm 176 of the bracket assembly 162, thereby coupling the bracket assembly 162 to the mounting block 146. The shaft 178 of the fastener 148 also extends through the aperture 100 in the mounting portion 98 to couple the actuator to the mounting block 146. In addition, the shaft 178 of the fastener 148 extends through openings 189 in the mounting block 146, which form a passage that extends from a first lateral side of the mounting block to a second lateral side of the mounting block, opposite the first lateral side. Accordingly, the shaft 178 extends through an entire extent of the passage. Because the driving rollers, the washers, and the actuator are coupled to the mounting block with a single fastener, the cost of the actuation system may be substantially reduced, as compared to actuation systems that utilize separate fasteners for the washers/driving rollers and the actuator.

In the illustrated embodiment, the roller assembly 144 includes a first bearing sleeve 190 disposed about the shaft 178 of the fastener 148 and within the opening 184 in the first driving roller 150. As illustrated, the shaft 178 extends through a passage 192 of the first bearing sleeve 190 to couple the first bearing sleeve 190 to the shaft 178 of the fastener 148. In addition, the roller assembly 144 includes a second bearing sleeve 194 disposed about the shaft 178 of the fastener 148 and within the opening 186 of the second driving roller 152. As illustrated, the shaft 178 extends through a passage 196 of the second bearing sleeve 194 to couple the second bearing sleeve 194 to the shaft 178 of the fastener 148. Each bearing sleeve is configured to facilitate rotation of the respective driving roller. For example, the outer surface of at least one bearing sleeve (e.g., the surface in contact with the respective driving roller) may have a surface roughness of about 0.5 Ra to about 1.0 Ra, about 0.6 Ra to about 0.9 Ra, or about 0.8 Ra, thereby reducing friction between the outer surface of the bearing sleeve and the respective driving roller. In addition, the compression force applied by the nut 160 may flow through the bearing sleeves, instead of through the driving rollers. As a result, the possibility of each driving roller becoming pinched between the respective bracket assembly arm and the respective washer may be substantially reduced or eliminated.

In certain embodiments, at least one bearing sleeve may be formed from stainless steel to substantially reduce corrosion, thereby substantially maintaining the low friction interface between the outer surface of the bearing sleeve and the respective driving roller. While the illustrated embodiment includes two bearing sleeves, it should be appreciated that alternative embodiments may include more or fewer bearing sleeves. For example, in certain embodiments, at least one bearing sleeve may be omitted, and the corresponding driving roller may be disposed directly about the shaft of the fastener. In further embodiments, the roller assembly may include more than two driving rollers and a corresponding number of bearing sleeves.

In the illustrated embodiment, the second guidance roller 172 is rotatably coupled to the mounting block 146 by the fastener 174. The fastener 174 is configured to engage a corresponding recess 198 in the mounting block 146 to couple the fastener and the second guidance roller to the mounting block. For example, the fastener may include a threaded end configured to engage corresponding threads within the recess. As illustrated, a shaft 200 of the fastener 174 extends through an opening 201 in a washer 202, which may be configured to engage a contact surface of the track assembly, and an opening 204 in the second guidance roller 172, thereby coupling the washer 202 and the second guidance roller 172 to the mounting block 146. In addition, the shaft 200 of the fastener 174 extends through an opening 206 in the second arm 170 of the bracket assembly 162, thereby coupling the bracket assembly 162 to the mounting block 146.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A roller assembly for a hood actuation system, comprising:
   a mounting block;
   a fastener having a shaft extending through the mounting block, wherein the fastener is configured to couple the mounting block to an actuator of the hood actuation system; and
   at least one driving roller, wherein the shaft of the fastener extends through an opening in the at least one driving roller to couple the at least one driving roller to the mounting block;
   wherein the mounting block has a recess configured to receive a mounting portion of the actuator, the shaft of the fastener extends through the recess, and the shaft of the fastener is configured to extend through an aperture in the mounting portion of the actuator to couple the mounting block to the actuator.

2. The roller assembly of claim 1, wherein the at least one driving roller comprises a first driving roller on a first lateral side of the mounting block and a second driving roller on a second lateral side of the mounting block, opposite the first lateral side.

3. The roller assembly of claim 1, comprising a washer disposed between the at least one driving roller and the mounting block, wherein the shaft of the fastener extends through an opening in the washer.

4. The roller assembly of claim 1, comprising a bearing sleeve disposed about the shaft of the fastener and within the opening in the at least one driving roller.

5. The roller assembly of claim 4, comprising a first washer disposed between the at least one driving roller and the mounting block, and a second washer disposed on an opposite lateral side of the at least one driving roller from the first washer, wherein the shaft of the fastener extends through respective openings in the first and second washers.

6. The roller assembly of claim 1, comprising at least one guidance roller rotatably coupled to the mounting block by a second fastener.

7. The roller assembly of claim 1, comprising a bracket assembly coupled to the mounting block, and a first guidance roller rotatably coupled to the bracket assembly.

8. The roller assembly of claim 7, wherein the bracket assembly comprises a first arm disposed between the at least one driving roller and the mounting block, and the shaft of the fastener extends through an opening in the first arm.

9. The roller assembly of claim 7, comprising a second guidance roller rotatably coupled to the mounting block, wherein the bracket assembly comprises a second arm disposed between the second guidance roller and the mounting block.

10. A roller assembly for a hood actuation system, comprising:
    a mounting block;
    a fastener having a shaft extending through the mounting block, the fastener configured to couple the mounting block to an actuator of the hood actuation system;
    a first driving roller, wherein the shaft of the fastener extends through an opening in the first driving roller to couple the first driving roller to the mounting block; and
    a first bearing sleeve disposed about the shaft of the fastener and within the opening in the first driving roller, wherein the first bearing sleeve has a first end configured to engage a first contact surface of the mounting block and a second end, opposite the first end, configured to engage a contact surface of a first blocking element of the fastener;
    wherein the mounting block has a recess configured to receive a mounting portion of the actuator, the shaft of the fastener extends through the recess, and the shaft of the fastener is configured to extend through an aperture in the mounting portion of the actuator to couple the mounting block to the actuator.

11. The roller assembly of claim 10, comprising a first washer disposed between the first driving roller and the mounting block, wherein the shaft of the fastener extends through an opening in the first washer.

12. The roller assembly of claim 11, comprising a second washer disposed on an opposite lateral side of the first driving roller from the first washer, wherein the shaft of the fastener extends through an opening in the second washer.

13. The roller assembly of claim 10, comprising a second driving roller positioned on an opposite lateral side of the mounting block from the first driving roller, wherein the shaft of the fastener extends through an opening in the second driving roller to couple the second driving roller to the mounting block.

14. The roller assembly of claim 13, comprising a second bearing sleeve disposed about the shaft of the fastener and within the opening in the second driving roller, wherein the second bearing sleeve has a first end configured to engage a second contact surface of the mounting block and a second end, opposite the first end, configured to engage a contact surface of a second blocking element of the fastener.

15. A roller assembly for a hood actuation system, comprising:
   a mounting block having a passage extending from a first lateral side of the mounting block to a second lateral side of the mounting block, opposite the first lateral side;
   a fastener having a shaft extending through an entire extent of the passage, the fastener configured to couple the mounting block to an actuator of the hood actuation system;
   a first driving roller, wherein the shaft of the fastener extends through an opening in the first driving roller to couple the first driving roller to the mounting block; and
   a first bearing sleeve disposed about the shaft of the fastener and within the opening in the first driving roller;
   wherein the mounting block has a recess configured to receive a mounting portion of the actuator, the shaft of the fastener extends through the recess, and the shaft of the fastener is configured to extend through an aperture in the mounting portion of the actuator to couple the mounting block to the actuator.

16. The roller assembly of claim 15, comprising a second driving roller positioned on an opposite lateral side of the mounting block from the first driving roller, wherein the shaft of the fastener extends through an opening in the second driving roller to couple the second driving roller to the mounting block.

17. The roller assembly of claim 16, comprising a second bearing sleeve disposed about the shaft of the fastener and within the opening in the second driving roller.

18. The roller assembly of claim 15, comprising a bracket assembly coupled to the mounting block, and a first guidance roller rotatably coupled to the bracket assembly.

19. The roller assembly of claim 18, comprising a second guidance roller rotatably coupled to the mounting block, wherein the bracket assembly comprises an arm disposed between the second guidance roller and the mounting block.

* * * * *